(12) United States Patent
Agarwal et al.

(10) Patent No.: US 10,318,594 B2
(45) Date of Patent: Jun. 11, 2019

(54) SYSTEM AND METHOD FOR ENABLING RELATED SEARCHES FOR LIVE EVENTS IN DATA STREAMS

(71) Applicant: Microsoft Technology Licensing, LLC, Redmond, WA (US)

(72) Inventors: Manoj Kumar Agarwal, Hyderabad (IN); Manish Gupta, Hyderabad (IN); Ambuj Pushkar Ojha, Ludhiana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/600,487

(22) Filed: May 19, 2017

(65) Prior Publication Data

US 2018/0336278 A1 Nov. 22, 2018

(51) Int. Cl.
*G06F 16/00* (2019.01)
*G06F 16/951* (2019.01)
*G06Q 50/00* (2012.01)
*G06N 5/02* (2006.01)
*G06F 16/35* (2019.01)
*G06F 16/2457* (2019.01)
*G06F 16/332* (2019.01)

(52) U.S. Cl.
CPC ...... *G06F 16/951* (2019.01); *G06F 16/24578* (2019.01); *G06F 16/3325* (2019.01); *G06F 16/35* (2019.01); *G06N 5/025* (2013.01); *G06Q 50/01* (2013.01)

(58) Field of Classification Search
CPC .............................. G06F 16/435; G06F 16/951
See application file for complete search history.

(56) References Cited

U.S. PATENT DOCUMENTS

| 8,898,163 | B2 | 11/2014 | Banerjee et al. |
| 2015/0261773 | A1 | 9/2015 | Walid et al. |
| 2016/0196563 | A1 | 7/2016 | Srinivasan et al. |
| 2018/0285444 | A1* | 10/2018 | Joshi ..................... G06F 16/435 |

OTHER PUBLICATIONS

Wang, et al., "Exploiting Hashtags for Adaptive Microblog Crawling", in Proceedings of IEEE/ACM International Conference on Advances in Social Networks Analysis and Mining, Aug. 25, 2013, pp. 311-315.
Agarwal, et al., "Keyword Search on microblog Data Streams: Finding Contextual Messages in Real Time", in Proceedings of 19th International Conference on Extending Database Technology, Mar. 15, 2016, pp. 604-607.

(Continued)

*Primary Examiner* — Etienne P Leroux
(74) *Attorney, Agent, or Firm* — Schwegman Lundberg & Woessner, P.A.

(57) ABSTRACT

Disclosed in some examples are methods, systems, devices, and machine readable mediums that automatically determine a set of one or more rules for finding items of content with high precision and high-recall. The disclosed methods enable applications to find content in rapidly changing datasets such as microblogs and other social networking feeds with a high precision and high recall, improving the accuracy of the application.

20 Claims, 6 Drawing Sheets

(56) References Cited

OTHER PUBLICATIONS

Agarwal, et al., "Real Time Discovery of Dense Clusters in Highly Dynamic Graphs: Identifying Real World Events in Highly Dynamic Environments", in Proceedings of 38th International Conference on Very Large Data Bases, Aug. 27, 2012, pp. 980-991.

Imran, et al., "Processing Social Media Messages in Mass Emergency: A Survey", in Journal of ACM Computing Surveys, vol. 47, No. 4, Jul. 2015, 37 pages.

Dork, et al., "A Visual Backchannel for Large-Scale Events", in Journal of IEEE Transactions on Visualization and Computer Graphics, vol. 16, No. 6, Nov. 2010, pp. 1129-1138.

Adedoyin-Olowe, Mariam, "An Association Rule Dynamics and Classication Approach to Event Detection and Tracking in Twitter", in Doctoral Thesis of Robert Gordon University, May 2015, 170 pages.

"International Search Report and Written Opinion Issued in PCT Application No. PCT/US18/028777", dated Jun. 7, 2018, 12 Pages.

\* cited by examiner

SYSTEM AND METHOD FOR ENABLING RELATED SEARCHES FOR LIVE EVENTS IN DATA STREAMS

BACKGROUND

Traditional methods of searching electronic content utilize a fixed set of keywords entered by a user. The search engine searches a plurality of content items looking for content items that match those keywords. The quality of the search results is dependent on the keywords chosen. Keywords may be too inclusive and match too many content items or may be too specific and miss content items relevant to the user's topic.

SUMMARY

Embodiments pertain to intelligent automatic search query optimization. Some embodiments relate to intelligent automatic search query optimization for content items on a microblog. For example, systems that automatically determine a set of one or more rules for finding items of content that enable applications to find content in rapidly changing datasets such as microblogs and other social networking feeds such that the returned content has a high precision and high recall. The method starts with a set of one or more seed rules and a batch of content items. The batch of content items are filtered with the seed rules and the remaining items are analyzed to find keywords and hashtags that occur frequently in the filtered set of content items. A co-occurrence analysis is then run on the frequently occurring keywords to develop a set of frequently co-occurring keywords. These frequently co-occurring keywords may then be used as a set of one or more candidate rules. A selection algorithm may then choose rules from the set of candidate rules based upon a score that measures each candidate rule's ability to return relevant content items compared to the existing rules. The scoring may be based upon an analysis of the proposed rule's ability to find content items with tags from the set of frequently occurring tags. The system may periodically (and in some examples, automatically) repeat the method utilizing the current rule set as the seed rules to update the set of one or more rules to return additional items of content that may be related to recent developments related to the topic of the search.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
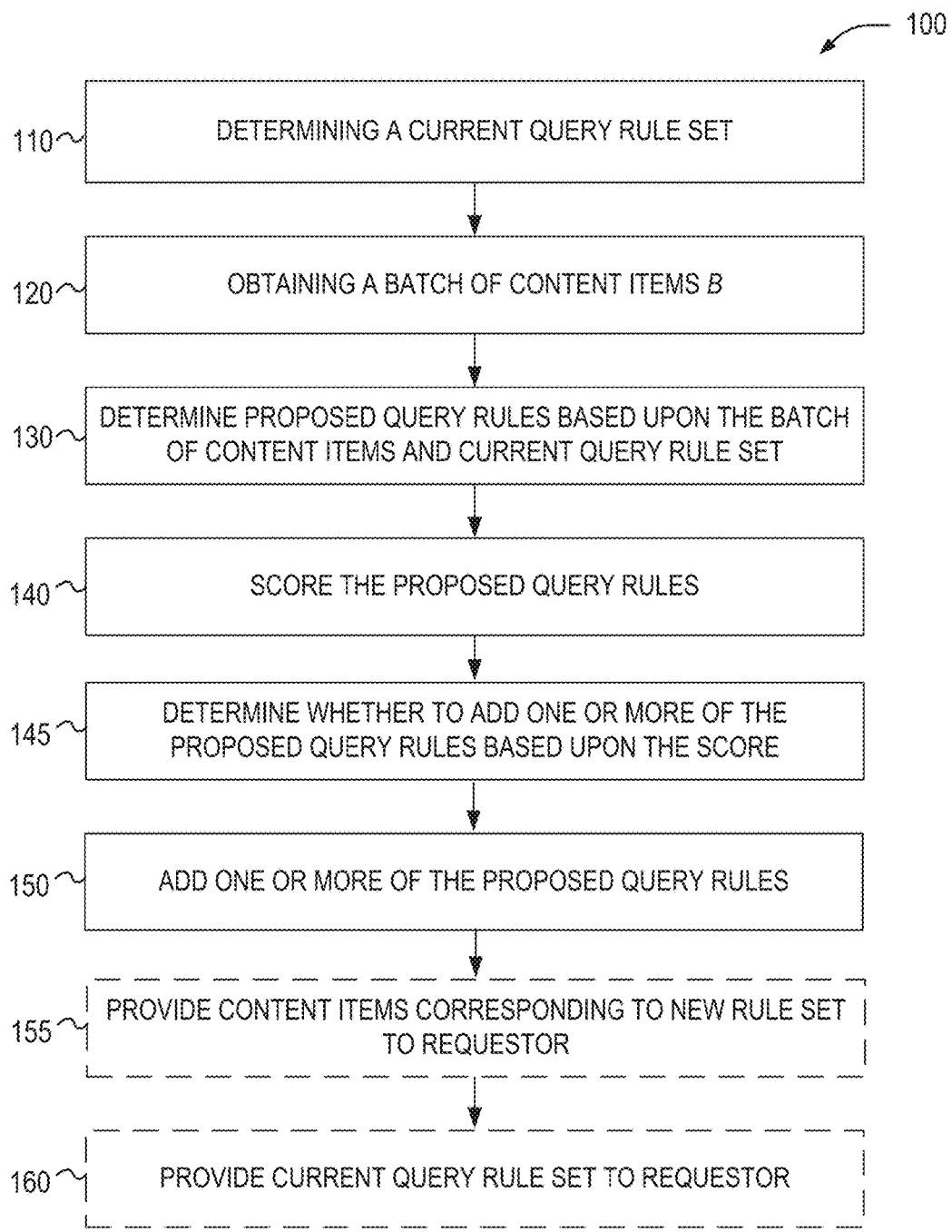
FIG. 1 shows a method of determining a rule set for finding an optimal rule set for retrieving content according to some examples of the present disclosure.

The problem of proper keyword selection is compounded when searches are directed to rapidly changing content such as content on microblogs (e.g., TWITTER®) or other social networking service content feeds. This content is produced by users of these services and changes rapidly. Selecting proper keywords may prove difficult as a set of keywords that is initially good may become less than ideal as the content changes. For example, keywords that at one time returned results with high precision and high recall may no longer provide the same level of precision and recall as the underlying content shifts and changes. This is especially true when the items of content relate to changing events (e.g., live events) as the event may experience new developments that require adjustments to the keywords to continue delivering relevant items of content.

Accurate content retrieval is important for applications which utilize these content sources. Examples include applications to understanding public sentiment towards an event; knowing the current hype around the event and predicting the events future popularity; summarizing the event to obtain social news; predicting event location; predicting event outcomes; detecting and warning about earthquakes and other weather related events; and the like. While a naïve approach may query the collection using the event keyword or hashtag, such a method suffers from poor recall—especially for events that are geographically and culturally diverse, since such events can have multiple popular representative keywords used by potentially disjoint users.

Disclosed in some examples are methods, systems, devices, and machine readable mediums that automatically determine a set of one or more rules for finding items of content. The disclosed methods enable applications to find content in rapidly changing datasets such as microblogs and other social networking feeds such that the returned content has a high precision and high recall. The method starts with a set of one or more seed rules (e.g., the event name or other tag) and a batch of content items (e.g., a content feed). The batch of content items are filtered with the seed rules and the remaining items are analyzed to find keywords and hashtags (e.g., metadata) that occur frequently in the filtered set of content items. A co-occurrence analysis is then run on the frequently occurring keywords to develop a set of frequently co-occurring keywords. These frequently co-occurring keywords may then be used as a set of one or more candidate rules. A selection algorithm may then choose rules from the set of candidate rules based upon a score that measures each candidate rule's ability to return relevant content items compared to the existing rules. The scoring may be based upon an analysis of the proposed rule's ability to find content items with tags from the set of frequently occurring tags. Each tag contributes a differing amount to the score of a proposed rule based upon a quality analysis of the tag. The system may periodically (and in some examples, automatically) repeat the method utilizing the current rule set as the seed rules to update the set of one or more rules to return additional items of content that may be related to recent developments related to the topic of the search.

FIG. 1 shows a method 100 of determining a rule set for finding an optimal rule set for retrieving content according to some examples of the present disclosure. FIG. 1 may be performed by a network-accessible search service, a user's computing device, a social networking service, or any other device with access (either direct, or programmatic through an application programming interface (API)) to the content that is to be searched. Content items refer to content uploaded (e.g., posted) to a service (such as a social networking service) that makes the content available to others. Examples include content posted to a social networking service (such as a microblog (e.g., TWEETS®)), content posted to a blog, and the like.

At operation 110 the system may obtain a current query rule set that may be one or more rules. Rules may comprise one or more keywords. For example, a rule may be a keyword. In other examples, the rule may include more than one keyword connected with Boolean operators (e.g., AND). In some examples, the current query rule set may comprise one or more rules formed from one or more initial seed keywords. In other examples in which the method of FIG. 1 was previously executed, the query rule set is the set of rules including the initial keywords and any previously added keywords.

At operation 120 a batch of content B may be obtained. For example, all content items from the content service in a predetermined time period (e.g., all content posted in the last day, week, year, or the like). Operations 110 and 120 may be performed as shown in FIG. 1, or may be performed in reverse—that is, operation 120 may be performed before operation 110. In some examples, operation 120 may comprise contacting a network based social networking service (e.g., a microblog service) according to an application programming interface (API) of the network based service. In other examples where the method may be implemented by the network based social networking service, this may comprise querying a database holding the posts, communications, or other content.

Figure 2:
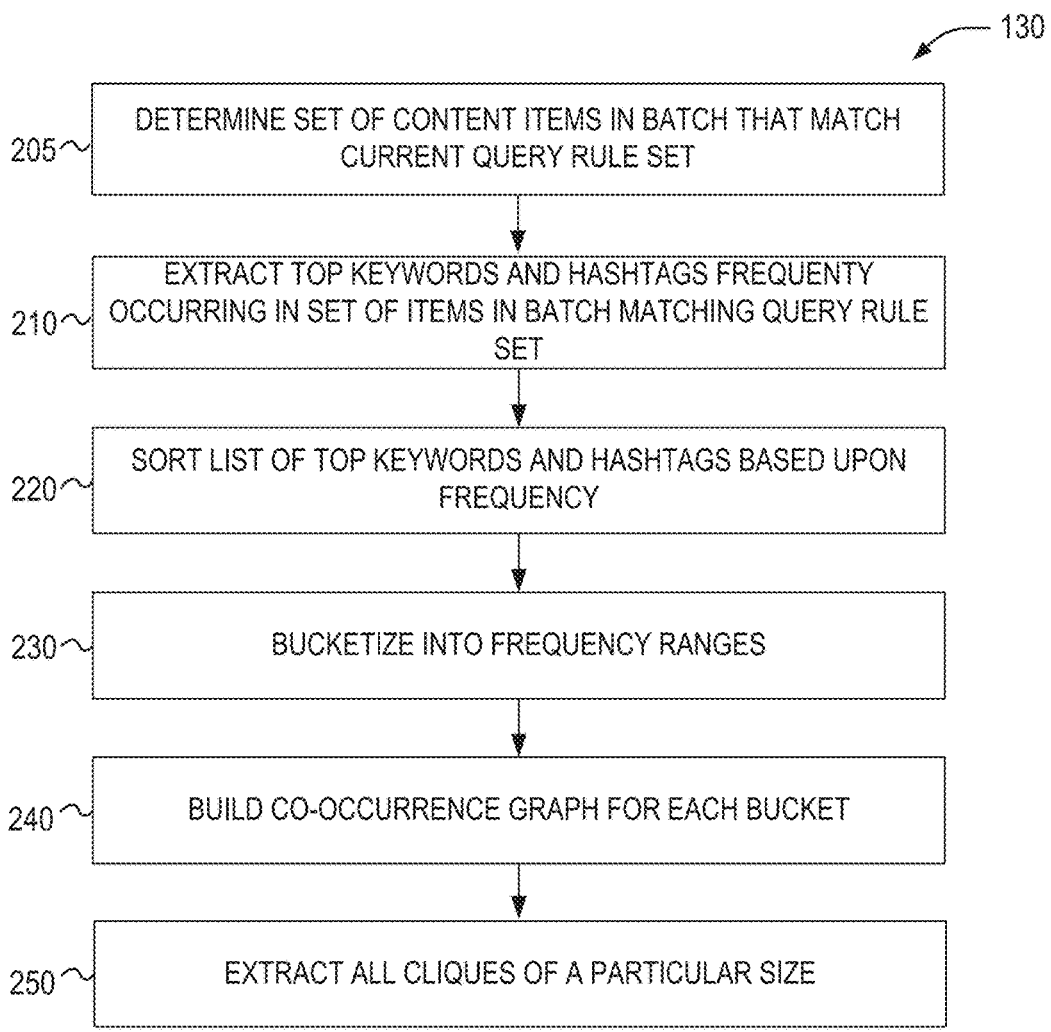
FIG. 2 shows a flowchart of a method of determining a proposed second query rule based upon the first results according to some examples of the present disclosure.

At operation 130, one or more proposed query rules may be determined based upon the results from operation 120 and the current query rule set obtained in operation 110. For example, given the batch of B content items and the current (or initial) rules R obtained in operation 110, the system may determine a top predetermined percentage of keywords $K_R$ terms and hashtags $H_R$ which frequently occur within content from B that matches R. Content from B that matches R is any content item that satisfies the rules R. For example, in the case that the rules are a set of keywords connected by an OR operator—any item of content including any one of the keywords may match. These top keywords $K_R$ may be analyzed to find keywords that frequently co-occur with each other in content from B that matches R. For each of these frequently co-occurring keywords a potential new rule may be created by appending the keyword to the current rule using a Boolean AND operator. Thus, if the system determines that there are two frequently co-occurring keywords: "X" and "Y", and the current ruleset is "A AND B", two potential rules are created: "A AND B AND X" and "A AND B AND Y." As previously noted, each proposed rule may comprise one or more keywords and logical connectors. FIG. 2 shows a more detailed example of a method of operation 130.

Figure 3:
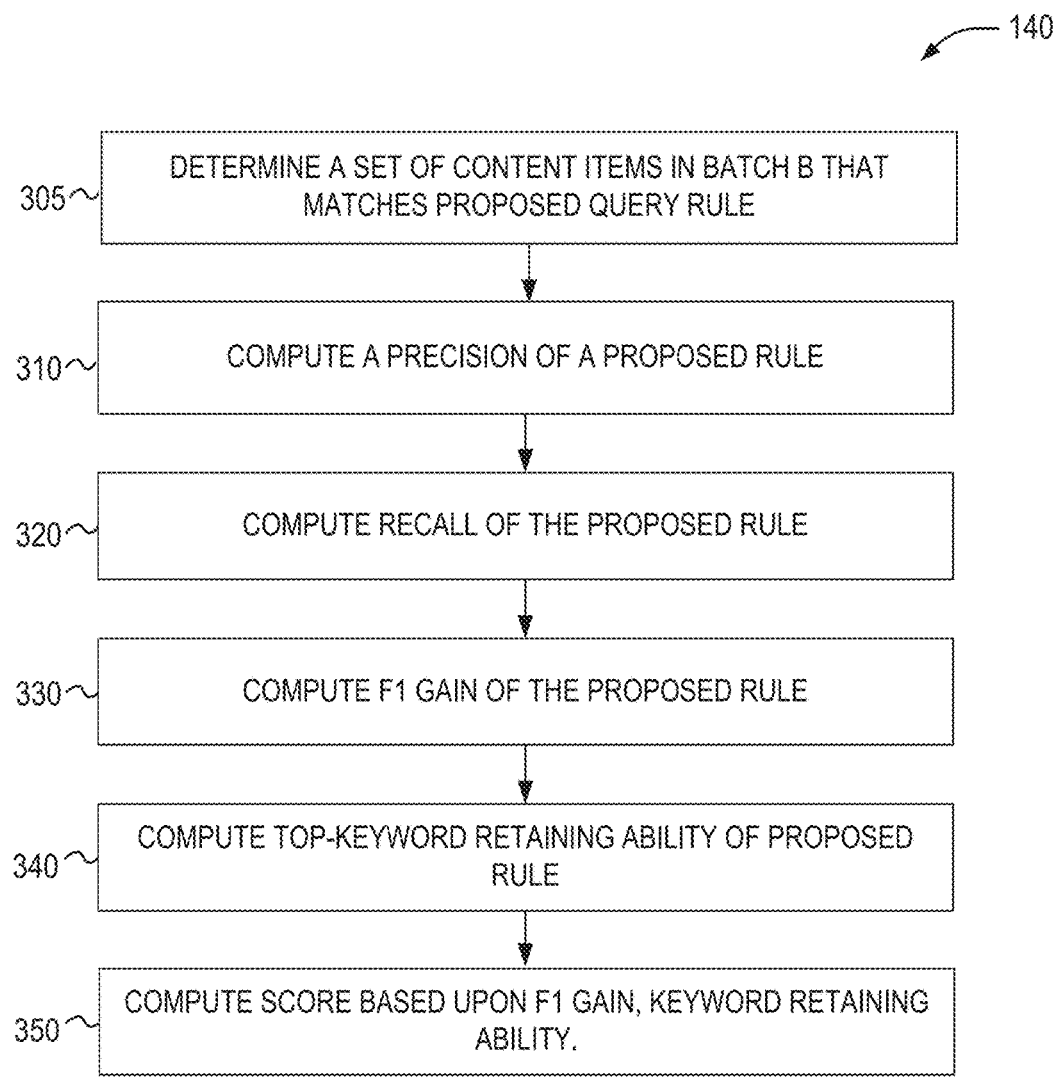
FIG. 3 shows a flowchart of a method of testing the proposed query rule based upon a relevance score according to some examples of the present disclosure.

At operation 140 the proposed rules may be scored. For example, a score (e.g., between a standardized range between zero and one, an uncapped numerical score, etc.) may be assigned to each particular proposed rule, the score may be based upon a precision and recall of the particular proposed rule as well as a metric indicating an ability of the particular proposed rule to retain top-keywords. In some examples, the precision and recall may be based upon a hashtag quality of the content items returned by the particular proposed rule as compared with the current rules as described below. FIG. 3 shows a more detailed example of a method of operation 140.

At operation 145, the system may determine whether to add a particular proposed query rule based upon the scores of each of the proposed query rules. In some examples, all particular proposed query rules are added that exceed a particular score threshold. The score threshold may be predetermined. In some examples, only the proposed query rules with the top predetermined number or percentage of scores for a particular run are added. In yet other examples, only the top scoring proposed query rule per run of method 100 may be added.

At operation 150 the one or more proposed query rules that are determined at operation 145 to be added are added to the current query rule set. A second run through of method 100 will include the query rules added at operation 150 to the current query rule set determined at operation 110. At operation 155, optionally, the system may provide the content items that match the search results corresponding to the new rule set to a requestor. A requestor may be a software application executing on a different computing device than method 100, a software application executing on the same computing device as method 100 or the like. At operation 160, optionally, the system may provide the query rule set to the requestor. For example, the requestor may utilize the query rule set to contact the social networking service itself to retrieve the matching content items.

FIG. 2 shows a flowchart of a method 130 of determining a proposed second query rule based upon the first results according to some examples of the present disclosure. Starting with a batch B of content items (e.g., a TWEET® stream), at operation 205, the set of content items in B matching R is found. At operation 210 the top keywords $K_R$ and hashtags $H_R$ frequently occurring within the set determined at operation 205 are determined. For example, a top k % or top k number of keywords and/or hashtags are determined. At operation 220, this list of top keywords and hashtags may be sorted based upon the frequency with which each keyword occurs in the larger dataset B. At operation 230, this list may be bucketized based upon the frequency. For example, change point detection may be employed on the frequency curve to detect buckets of keywords. Each bucket then includes groups of keywords in similar frequency ranges.

At operation 240, a co-occurrence graph may be built for each bucket. Each node in the graph is a keyword. Given a bucket of keywords, two nodes of the graph are connected by an edge if the Jaccard similarity is higher than a threshold. For example, if $T(K_A)$ is the set of content items from B matching R in which $K_A$ appears, and if $T(K_B)$ is the set of content items from B matching R in which $K_B$ appears (wherein A and B are different keywords), then the Jaccard similarity between A and B may be:

$$\frac{|T(K_A) \cap T(K_B)|}{|T(K_A) \cup T(K_B)|}$$

Thus, the Jaccard similarity is the number of content items in which both $K_A$ and $K_B$ appear divided by the number of content items in which either $K_A$ or $K_B$ appear. At operation 250, all cliques of greater than or equal to a predetermined number (e.g., two or greater) from the graphs are extracted as proposed new rules. Cliques are subsets of nodes whereby every node is adjacent to every other node. For example, finding a clique of at least 2 involves finding at least one subgraph of at least 2 nodes that are adjacent.

FIG. 3 shows a flowchart of a method of testing the proposed query rule based upon a relevance score 140 according to some examples of the present disclosure. At operation 305 the system may determine a set of content items in the batch B that matches the proposed query rule. This set may be utilized in calculating the score as demonstrated below. A score according to FIG. 3 is computing utilizing a $$\frac{benefit}{cost}$$

approach. A cost of a proposed rule r given a current rule R may be defined as the number of unrelated content items (false positives) obtained due to the match with r. In some examples, the score may utilize hashtag (or other tags or metadata) quality of results in the set determined in operation 305 to hashtag quality of results from the old rules (e.g., the hashtag quality of the set of results from operation 205) to determine the score of a proposed rule. A rule may be beneficial if it gets more relevant content items compared to the ones gathered using existing rules.

Let T(R,h) denote the set of content items matching a rule set R and containing a particular hashtag h, and T(h) denote the set of content items in a batch B containing h. Given a batch of B of content items, a hashtag h and a rule set R, we may define the quality of a hashtag h under R as:

$$HQ(h \mid R) = \frac{|T(R, h)|}{|T(h)|}$$

Thus, each hashtag has an associated quality score that is calculated based upon the number of content items containing h within R divided by the number of content items containing h in B. This calculation measures the importance of a hashtag based upon how exclusive it is to the content items matching R as opposed to content items in the more general B. Thus, hashtags that are generic (and occur frequently in both content matching R and content not matching R) will have a lower quality score than hashtags that frequently occur in R but not as frequently in other content items in the broader set B. Thus, if B contains 100 content items, and the ruleset R is "#election" which is in 50 of the content items, and if h is "#trump", which is in 25 of the 50 content items matching R, and in 10 of the content items not matching R, HQ(#trump|#election)=25/35=0.71.

A hashtag quality of an item of content may be represented as the average hashtag quality of hashtags from $H_R$ which are also present in a content item t:

$$HQ(t \mid R) = \frac{\sum_{h \in H_R \text{ and } h \in t} HQ(h \mid R)}{|T(h)|}$$

At operation 310 the system may compute a precision of a ruleset R given a batch of B content items. A precision may be the fraction of relevant content items among all the retrieved content items where relevancy may be defined based upon hashtag quality HQ. Given the hashtag set $H_R$ and the current rule set R, the set of content items in B matching R may be denoted as T(R) and the set of content items in B matching both R and containing a hashtag in $H_R$ may be defined as T(R,$H_R$). The hashtag-based precision of R may be given by:

$$\text{Precision}(R \mid H_R) = \frac{\sum_{t \in T(R, H_R)} HQ(t \mid R)}{|T(R)|}$$

Where T(R,$H_R$) is the set of content items in B matching R and including at least one tag from $H_R$. Thus the precision is the sum of the hashtag quality score for all content items of B matching rule R that have hashtags in the set of hashtags $H_R$ divided by the total number of content items matching R. As can be appreciated, each item of content contributes to the precision an amount proportional to the quality of hashtags it contains. The quality of the hashtag in this case corresponds to its exclusivity in the content matching R. In other examples, other measures of hashtag quality may be utilized.

At operation 320, a recall of a rule R may be calculated. Recall may be defined as the fraction of relevant content items that have been retrieved over the total content items. Since it may be difficult to estimate the number of relevant content items in the total set, in some examples, recall of an old rule set R may be defined with reference to the proposed new rule. That is, the recall of the old ruleset may be based upon the fraction of relevant content it produced as compared with the new rule. For example:

$$\text{Recall}(R \mid H_R, r) = \frac{\sum_{t \in T(R, H_R)} HQ(t \mid R)}{\sum_{t \in T(R \cup r, H_R)} HQ(t \mid R \cup r)}$$

Thus, the recall may be the hashtag quality of all hashtags in all content items from B matching the old rules (R) divided by the hashtag quality of all hashtags in all content items from B matching the proposed new rule (R∪r). In some examples, Recall(R∪r|$H_R$) may be 1 (as noted earlier, the recall is defined with respect to a proposed new rule, but since the proposed new rule is utilized as the measure of perfect recall, it is 1).

At operation 330 the method may compute the F1 gain of adding a new rule r to the current rule set of R. Given a new rule r, and hashtag sets $H_R$, $H_{R \cup \{r\}}$ under rule sets R and R∪{r} respectively, the F1 gain of adding r to R may be:

F1 Gain(R,r)=F1(R∪{r})−F1(R)

Where:

$$F1(R \cup \{r\}) = \frac{2 \times \text{Prec}(R \cup \{r\} \mid H_{R \cup \{r\}}) \times \text{Rec}(R \cup \{r\} \mid H_{R \cup \{r\}})}{\text{Prec}(R \cup \{r\} \mid H_{R \cup \{r\}}) + \text{Rec}(R \cup \{r\} \mid H_{R \cup \{r\}})}$$

$$F1(R) = \frac{2 \times \text{Prec}(R \mid H_R) \times \text{Rec}(R \mid H_{R,r})}{\text{Prec}(R \mid H_R) + \text{Rec}(R \mid H_{R,r})}$$

Note, as previously explained:

Rec(R∪{r}|$H_{R \cup \{r\}}$)=1

Thus, simplifying:

$$F1\text{Gain}(R, r) = \frac{2 \times \text{Prec}(R \cup \{r\} \mid H_{R \cup \{r\}}) \times 1}{\text{Prec}(R \cup \{r\} \mid H_{R \cup \{r\}}) + 1} - \frac{2 \times \text{Prec}(R \mid H_R) \times \text{Rec}(R \mid H_{R,r})}{\text{Prec}(R \mid H_R) + \text{Rec}(R \mid H_{R,r})}$$

In some examples, it may be desirable to prefer new rules that do not cause too much change in the distribution of the top k % of the keywords in the returned content items matching the rule as compared with the content items matching the existing rule set. At operation 340 a top-keyword retaining ability of the proposed rule may be calculated. Let T(r) denote the set of content items from B that match the rule r. Similarly, let T(r, $K_R$) denote the set of content items from B matching rule r, and containing at least one keyword in the set $K_R$.

Given an existing rule set R, the top k % keywords $K_R$ and a new rule r, the top keyword retaining ability of the new rule r given the current rule set R may be defined as:

$$KR(r \mid R) = \frac{|T(r, K_R)|}{|T(r)|}$$

As noted, the score of a particular keyword is $$\frac{\text{benefit}}{\text{cost}}$$

so:

$$\text{Score}(\text{Rule } r \mid R) = \frac{\text{benefit } (r \mid R)}{\text{cost } (r \mid R)}$$

Where cost (r|R) denotes the set of non-relevant content items added by the rule r over those already present due to R, cost (r|R) may be computed as extra content items returned by rule r minus the relevant content items:

$$\text{cost}(r \mid R) = (|T(R \cup \{r\})| - |T(R)|) - \sum_{t \in T(R \cup \{r\}, H_R) - T(R, H_R)} HQ(t \mid R)$$

Where (T(R∪{r}, $H_R$)−T(R, $H_R$) is the difference between the two sets T(R∪{r}, $H_R$) and T(R, $H_R$).

The benefit of a rule r may be defined as the number of new items of content returned because of the inclusion of r times the F1 gain times the keyword retaining ability of rule r.

$$\text{benefit}(r \mid R) = (|T(R \cup \{r\})| - |T(R)|) \times F1 \text{ Gain}(R, r) \times KR(r \mid R)$$

The score of the rule may be calculated at operation 350 as the benefit/cost. As can be appreciated by one of ordinary skill in the art with the benefit of the present disclosure, other scoring functions than the above scoring function may be utilized.

In some examples, the system may utilize a greedy algorithm that computes the score of every candidate rule using the above equations and picks the one that has a highest score in the current iteration.

Figure 4:
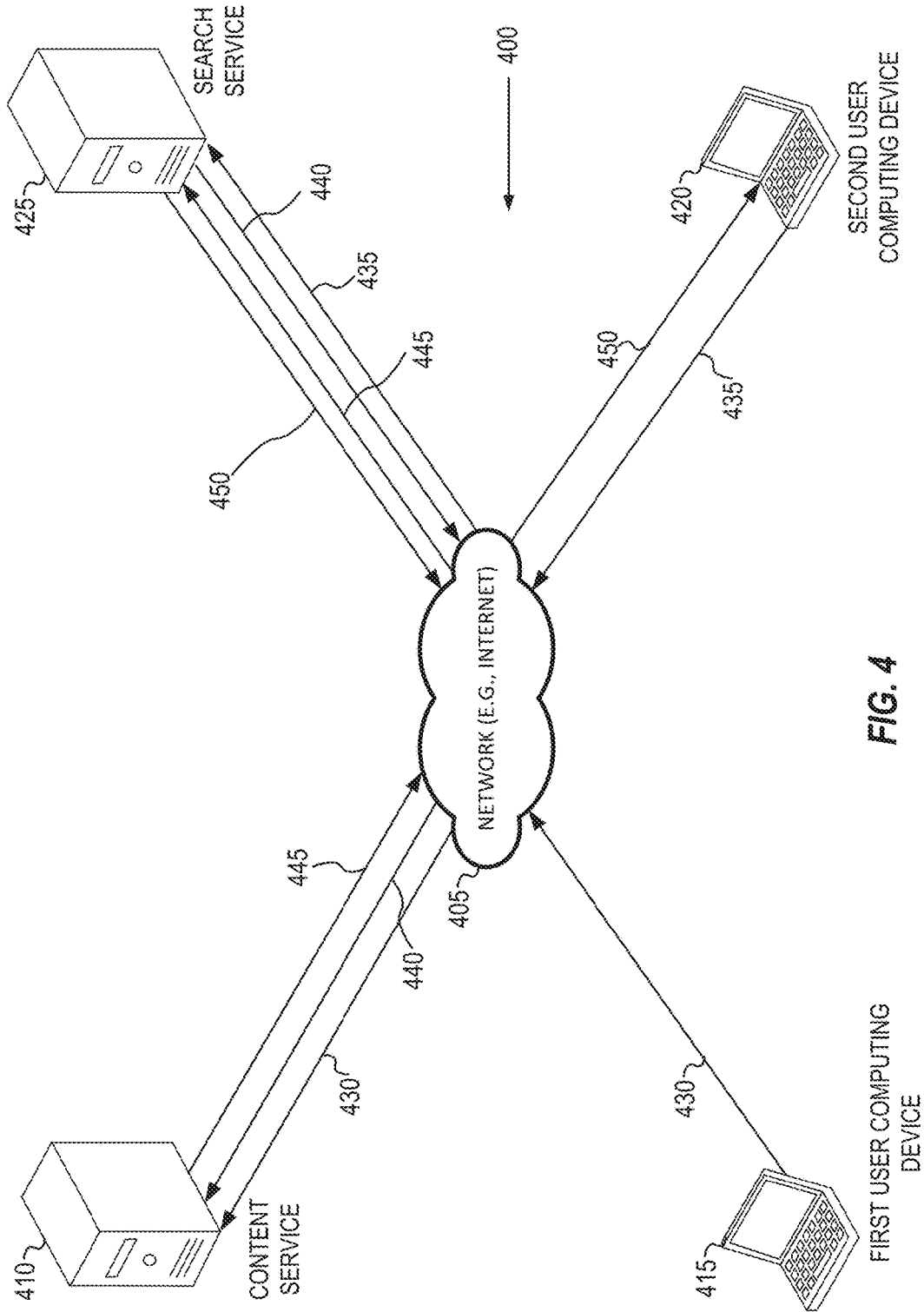
FIG. 4 shows a diagram of a system for providing content items according to some examples of the present disclosure.

FIG. 4 shows a diagram of a system 400 for providing content items according to some examples of the present disclosure. As shown, a first user computing device 415, which may be a computing device of a user of a content service, a content service 410, a search service 425, and a second user computing device 420 which may be a computing device of a user of search service may be communicatively coupled using a computer network 405. Computer network 405 may be or include the Internet (or portions thereof), a Wide Area Network (WAN), a Local Area Network (LAN), or the like. In other examples, components may be communicatively coupled in other ways. For example, one or more of the functions of the content service 410, search service 425, first user computing device 415, and second user computing device 420 may be performed by a same computing device. For example, the content service 410 may also implement the search service 425. Similarly, the first user computing device 415 may be a same computer as the second user computing device 420. In other examples, the first user computing device 415 and/or the second user computing device 420 may implement one or both of the content service 410 and/or the search service 425. In some examples, the components communicate without crossing an Internet backbone (e.g., through a LAN, a local interface, or the like).

Content service 410 may store one or more items of content. In some examples the content service 410 may be a social networking service. Example social networking services may include TWITTER®, LINKEDIN®, FACEBOOK®, and the like. In some examples, the content for microblogs such as TWITTER® include the microblog posts (e.g., TWEETS®). For other social networking services such as FACEBOOK® and LINKEDIN® the content may include user posted or generated content such as shared content, posted content, messages, and the like. In some examples, the content may be labelled or tagged with a "hashtag" which is a label preceded by a "#" symbol. For example, a first user computing device 415 may send content 430 to the content service 410 to post on a social networking profile page of the user. For example, content 430 may be a TWEET®.

A user of the search service may utilize their computing device (e.g., second user computing device 420) to send a search request 435 to the search service 425. The search request 435 may include one or more initial search rules (e.g., a hash tag). At a previous time, or in response to the search request 435, the search service 425 may send a content request message 440 to content service 410. The content request message 440 may be for the set of content items B. For example, a TWEET® stream from a predetermined time period. Content service 410 may search a content repository for content, such as content 430 that matches the initial search rules. Content matching the request may be sent from content service 410 to search service 425 using message 445. Search service may implement the methods of FIGS. 1-3 to find additional rules to find more relevant content than what was returned by the content service 410. As part of this process, the search service may request additional content using additional proposed rules. Once the search service has completed the process of FIGS. 1-3, the final results may be sent back to the second user computing device 420 using response 450. In some examples, once the search is setup by the user of the search service using their computing device 420, the processes of FIGS. 1-3 may be run at predetermined intervals in order to retrieve additional content. This additional content may then be sent back to the computing device 420 of the user of search service 425 using response 450.

Figure 5:
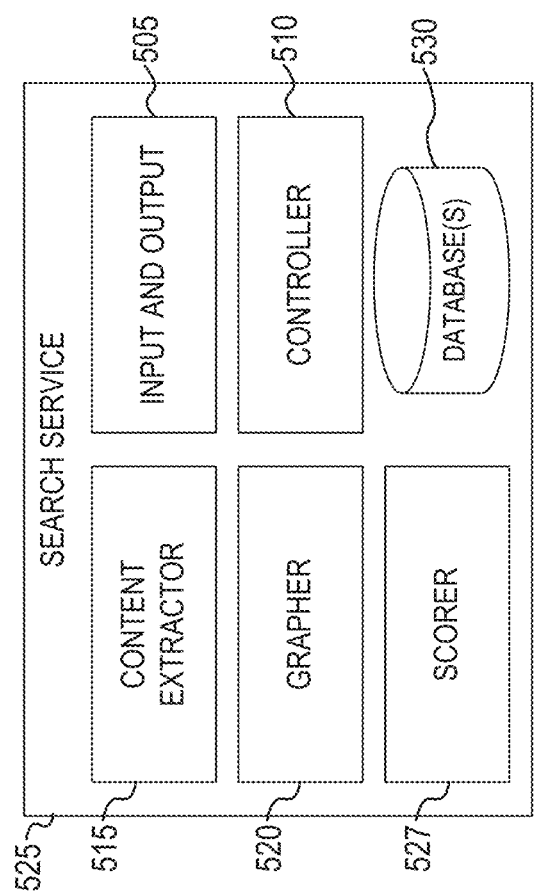
FIG. 5 shows a logical diagram of a search service according to some examples of the present disclosure.

FIG. 5 shows a logical diagram of a search service 525 according to some examples of the present disclosure. In some examples, search service 525 may be an example embodiment of search service 425. Search service 525 may perform the methods of any one or more of FIGS. 1-3. Input and output 505 may receive search requests from other computing devices, including over one or more computer networks. Requests may also be received from processes on a computing device on which search service 525 is implemented. Controller 510 may instruct the input and output 505 to communicate with one or more content services (such as content service 410) to request content matching one or more current search rules (e.g., as specified in the request). Once the content is returned (via input and output 505) the controller 510 may pass the returned content to the content extractor 515. Content extractor 515 may extract the top keywords and hashtags frequently co-occurring from the initial search results. Content extractor 515 may then sort the list of top keywords and hashtags based upon frequency and bucketize that list. Controller 510 may then pass these bucketized lists to the grapher 520. Grapher may create one or more co-ocurrence graphs and return all cliques that meet a determined criteria (e.g., all cliques>=2) as potential rules. Controller 510 may then pass each potential rule to the scorer 527. Scorer 527 may compute a precision, recall F1 gain, keyword retaining ability and finally, the score for each of the proposed rules. The controller 510 may then select one or more proposed rule based upon the score. For example, rules that score in a top predetermined number or percentage as compared with the other proposed rules may be selected. Input and output 505 may then return the results to the requestor. In some examples, database(s) 530 may store the current set of rules for later reference (e.g., a later request or a periodic update).

Figure 6:
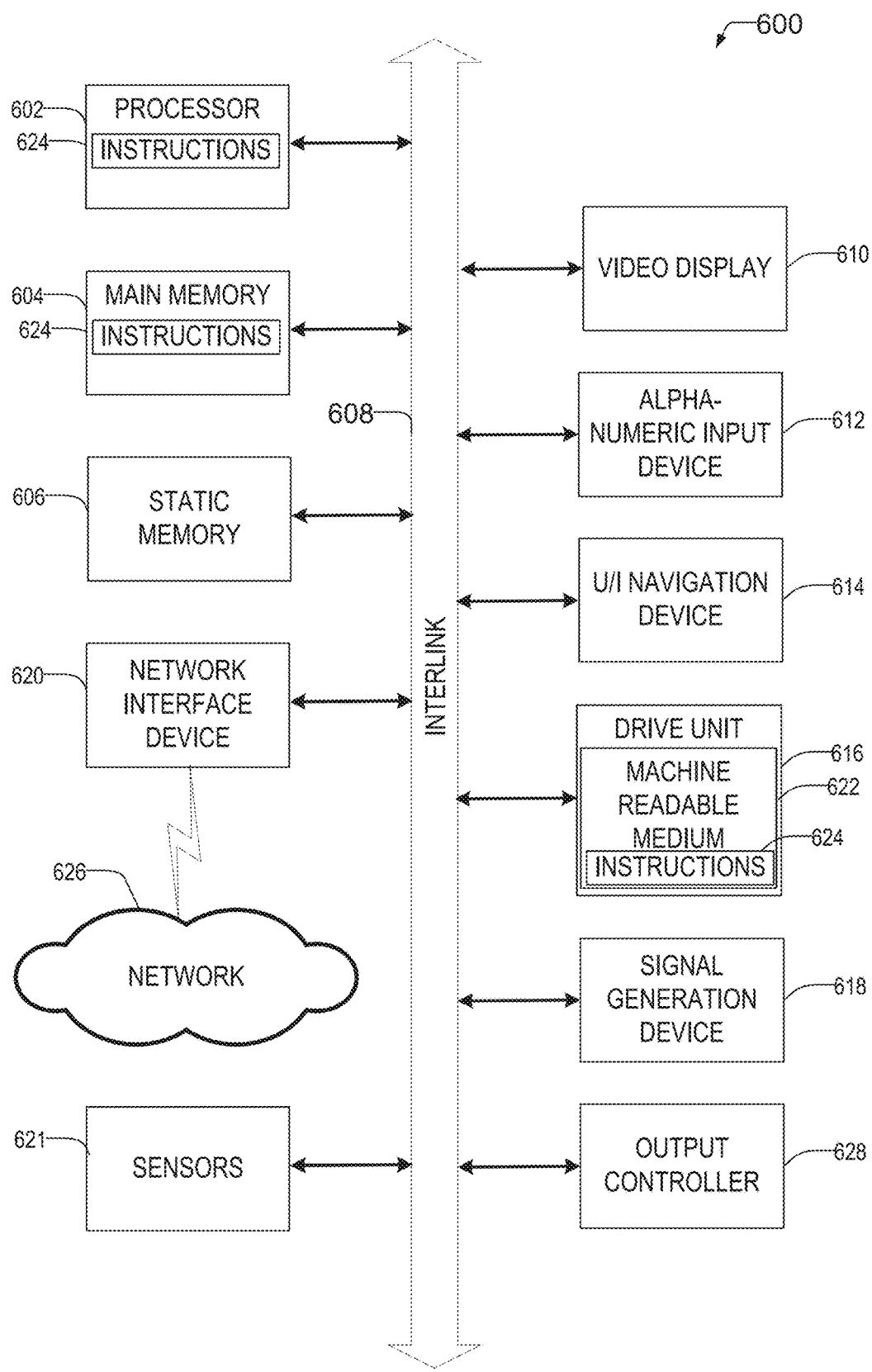
FIG. 6 illustrates a block diagram of an example machine which may implement any one or more of the techniques (e.g., methodologies) discussed herein.

FIG. 6 illustrates a block diagram of an example machine 600 which may implement any one or more of the techniques (e.g., methodologies) discussed herein. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 600 may be configured (either with hardware or software) to execute the methods of FIGS. 1-4 and implement the modules or components of FIG. 5. The machine 600 may implement the social networking service. The machine 600 may be one of the first or second user computing devices. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a machine-readable medium for searching content items for content corresponding to an event, the machine-readable medium comprising instructions, which when executed by a machine, cause the machine to perform the operations of: determining a first query rule, the first query rule related to the event; obtaining from a content repository a first set of one or more content items; determining a second set of content items comprising content items from the first set that match the first query rule; determining a proposed second query rule based upon co-occurrences of terms in the second set of content items; determining a third set of content items comprising content items from the first set that match the proposed second query rule; scoring the proposed second query rule, the score based upon a tag quality score of tags in the second and third sets of content items; adding the proposed second query rule to the first query rule based upon determining that the score is over a threshold score; and providing the third set of content items to a requester.

In Example 2, the subject matter of Example 1 optionally includes wherein the first set of one or more content items are microblog messages, and wherein the tags are hashtags.

In Example 3, the subject matter of any one or more of Examples 1-2 optionally include wherein the operations of determining the proposed second query rule based upon co-occurrence of terms in the second set of content items comprises the operations of: extracting a list of keywords that frequently occur from content items in the second set of content items; sorting the list of keywords based upon total frequency of the keywords in the first set of content items; bucketizing the sorted list of keywords based upon frequency into a plurality of buckets; constructing, for each bucket of the plurality of buckets, a co-occurrence graph, the co-occurrence graph based upon co-occurrence of different keywords in same content items; and extracting the proposed second query rule as a clique that is greater than or equal to a predetermined number from the co-occurrence graph of one of the plurality of buckets.

In Example 4, the subject matter of any one or more of Examples 1-3 optionally include wherein the operations of scoring the proposed second query rule comprises the operations of: computing a precision for the first query rule based upon a tag quality of tags from a set of previously determined tags that are present in the second set of content items; computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

In Example 5, the subject matter of Example 4 optionally includes wherein the operations of scoring the proposed second query rule comprises the operations of: computing a recall of the first query rule based upon tag quality of the first rule and tag quality of the proposed second query rule; computing an F1 gain based upon the precision for the first query rule, precision for the proposed second query rule, and the recall of the first query rule; computing a top-keyword retaining ability score of the proposed second query rule, the top-keyword retaining ability score measuring a similarity between keywords in the second and third sets of content; and calculating the score based upon the F1 gain and the top-keyword retaining ability score.

In Example 6, the subject matter of any one or more of Examples 1-5 optionally include wherein the operations are performed in response to an expiry of a predetermined interval.

In Example 7, the subject matter of any one or more of Examples 1-6 optionally include wherein the first query rule is received over a computer network, and wherein the operations of obtaining from the content repository the first set of one or more content items comprises sending a message over the computer network to the content repository.

In Example 8, the subject matter of any one or more of Examples 1-7 optionally include wherein the first query rule is received over a computer network, and wherein the operations of obtaining from the content repository the first set of one or more content items is performed without traversing an Internet backbone.

In Example 9, the subject matter of any one or more of Examples 1-8 optionally include wherein the threshold score is a score of a next-highest scoring proposed rule.

Example 10 is a method for searching content items for content corresponding to an event, the method comprising: using one or more processors to perform the operations of: determining a first query rule, the first query rule related to the event; obtaining from a content repository a first set of one or more content items; determining a second set of content items comprising content items from the first set that match the first query rule; determining a proposed second query rule based upon co-occurrences of terms in the second set of content items: determining a third set of content items comprising content items from the first set that match the proposed second query rule; scoring the proposed second query rule, the score based upon a tag quality score of tags in the second and third sets of content items; adding the proposed second query rule to the first query rule based upon determining that the score is over a threshold score; and providing the third set of content items to a requester.

In Example 11, the subject matter of Example 10 optionally includes wherein the first set of one or more content items are microblog messages, and wherein the tags are hashtags.

In Example 12, the subject matter of any one or more of Examples 10-11 optionally include wherein determining the proposed second query rule based upon co-occurrence of terms in the second set of content items comprises: extracting a list of keywords that frequently occur from content items in the second set of content items; sorting the list of keywords based upon total frequency of the keywords in the first set of content items; bucketizing the sorted list of keywords based upon frequency into a plurality of buckets; constructing, for each bucket of the plurality of buckets, a co-occurrence graph, the co-occurrence graph based upon co-occurrence of different keywords in same content items; and extracting the proposed second query rule as a clique that is greater than or equal to a predetermined number from the co-occurrence graph of one of the plurality of buckets.

In Example 13, the subject matter of any one or more of Examples 10-12 optionally include wherein scoring the proposed second query rule comprises: computing a precision for the first query rule based upon a tag quality of tags from a set of previously determined tags that are present in the second set of content items; computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

In Example 14, the subject matter of Example 13 optionally includes wherein scoring the proposed second query rule comprises: computing a recall of the first query rule based upon tag quality of the first rule and tag quality of the proposed second query rule; computing an F1 gain based upon the precision for the first query rule, precision for the proposed second query rule, and the recall of the first query rule; computing a top-keyword retaining ability score of the proposed second query rule, the top-keyword retaining ability score measuring a similarity between keywords in the second and third sets of content; and calculating the score based upon the F1 gain and the top-keyword retaining ability score.

In Example 15, the subject matter of any one or more of Examples 10-14 optionally include wherein the operations are performed in response to an expiry of a predetermined interval.

In Example 16, the subject matter of any one or more of Examples 10-15 optionally include wherein the first query rule is received over a computer network, and wherein obtaining from the content repository the first set of one or more content items comprises sending a message over the computer network to the content repository.

In Example 17, the subject matter of any one or more of Examples 10-16 optionally include wherein the first query rule is received over a computer network, and wherein obtaining from the content repository the first set of one or more content items is performed without traversing an Internet backbone.

In Example 18, the subject matter of any one or more of Examples 10-17 optionally include wherein the threshold score is a score of a next-highest scoring proposed rule.

Example 19 is a system for searching content items for content corresponding to an event, the system comprising: one or more processors; a memory communicatively coupled to the one or more processors and comprising instructions which when executed by the one or more processors, cause the system to perform the operations of: determining a first query rule, the first query rule related to the event; obtaining from a content repository a first set of one or more content items; determining a second set of content items comprising content items from the first set that match the first query rule; determining a proposed second query rule based upon co-occurrences of terms in the second set of content items; determining a third set of content items comprising content items from the first set that match the proposed second query rule; scoring the proposed second query rule, the score based upon a tag quality score of tags in the second and third sets of content items; adding the proposed second query rule to the first query rule based upon determining that the score is over a threshold score; and providing the third set of content items to a requester.

In Example 20, the subject matter of Example 19 optionally includes wherein the first set of one or more content items are microblog messages, and wherein the tags are hashtags.

In Example 21, the subject matter of any one or more of Examples 19-20 optionally include wherein the operations of determining the proposed second query rule based upon co-occurrence of terms in the second set of content items comprises the operations of: extracting a list of keywords that frequently occur from content items in the second set of content items; sorting the list of keywords based upon total frequency of the keywords in the first set of content items; bucketizing the sorted list of keywords based upon frequency into a plurality of buckets; constructing, for each bucket of the plurality of buckets, a co-occurrence graph, the co-occurrence graph based upon co-occurrence of different keywords in same content items; and extracting the proposed second query rule as a clique that is greater than or equal to a predetermined number from the co-occurrence graph of one of the plurality of buckets.

In Example 22, the subject matter of any one or more of Examples 19-21 optionally include wherein the operations of scoring the proposed second query rule comprises the operations of: computing a precision for the first query rule based upon a tag quality of tags from a set of previously determined tags that are present in the second set of content items; computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

In Example 23, the subject matter of Example 22 optionally includes wherein the operations of scoring the proposed second query rule comprises the operations of: computing a recall of the first query rule based upon tag quality of the first rule and tag quality of the proposed second query rule; computing an F1 gain based upon the precision for the first query rule, precision for the proposed second query rule, and the recall of the first query rule; computing a top-keyword retaining ability score of the proposed second query rule, the top-keyword retaining ability score measuring a similarity between keywords in the second and third sets of content; and calculating the score based upon the F1 gain and the top-keyword retaining ability score.

In Example 24, the subject matter of any one or more of Examples 19-23 optionally include wherein the operations are performed in response to an expiry of a predetermined interval.

In Example 25, the subject matter of any one or more of Examples 19-24 optionally include wherein the first query rule is received over a computer network, and wherein the operations of obtaining from the content repository the first set of one or more content items comprises sending a message over the computer network to the content repository.

In Example 26, the subject matter of any one or more of Examples 19-25 optionally include wherein the first query rule is received over a computer network, and wherein the operations of obtaining from the content repository the first set of one or more content items is performed without traversing an Internet backbone.

In Example 27, the subject matter of any one or more of Examples 19-26 optionally include wherein the threshold score is a score of a next-highest scoring proposed rule.

Example 28 is a device for searching content items for content corresponding to an event, the device comprising: means for determining a first query rule, the first query rule related to the event; means for obtaining from a content repository a first set of one or more content items; means for determining a second set of content items comprising content items from the first set that match the first query rule; means for determining a proposed second query rule based upon co-occurrences of terms in the second set of content items; means for determining a third set of content items comprising content items from the first set that match the proposed second query rule; means for scoring the proposed second query rule, the score based upon a tag quality score of tags in the second and third sets of content items; means for adding the proposed second query rule to the first query rule based upon determining that the score is over a threshold score; and means for providing the third set of content items to a requester.

In Example 29, the subject matter of Example 28 optionally includes wherein the first set of one or more content items are microblog messages, and wherein the tags are hashtags.

In Example 30, the subject matter of any one or more of Examples 28-29 optionally include wherein the means for determining the proposed second query rule based upon co-occurrence of terms in the second set of content items comprises: means for extracting a list of keywords that frequently occur from content items in the second set of content items; means for sorting the list of keywords based upon total frequency of the keywords in the first set of content items; means for bucketizing the sorted list of keywords based upon frequency into a plurality of buckets; means for constructing, for each bucket of the plurality of buckets, a co-occurrence graph, the co-occurrence graph based upon co-occurrence of different keywords in same content items; and means for extracting the proposed second query rule as a clique that is greater than or equal to a predetermined number from the co-occurrence graph of one of the plurality of buckets.

In Example 31, the subject matter of any one or more of Examples 28-30 optionally include wherein the means for scoring the proposed second query rule comprises: means for computing a precision for the first query rule based upon a tag quality of tags from a set of previously determined tags that are present in the second set of content items; means for computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

In Example 32, the subject matter of Example 31 optionally includes wherein the means for scoring the proposed second query rule comprises: means for computing a recall of the first query rule based upon tag quality of the first rule and tag quality of the proposed second query rule; means for computing an F1 gain based upon the precision for the first query rule, precision for the proposed second query rule, and the recall of the first query rule; means for computing a top-keyword retaining ability score of the proposed second query rule, the top-keyword retaining ability score measuring a similarity between keywords in the second and third sets of content; and means for calculating the score based upon the F1 gain and the top-keyword retaining ability score.

In Example 33, the subject matter of any one or more of Examples 28-32 optionally include wherein the operations are performed in response to an expiry of a predetermined interval.

In Example 34, the subject matter of any one or more of Examples 28-33 optionally include wherein the first query rule is received over a computer network, and wherein the means for obtaining from the content repository the first set of one or more content items comprises means for sending a message over the computer network to the content repository.

In Example 35, the subject matter of any one or more of Examples 28-34 optionally include wherein the first query rule is received over a computer network, and wherein the means for obtaining from the content repository the first set of one or more content items is performed without traversing an Internet backbone.

In Example 36, the subject matter of any one or more of Examples 28-35 optionally include wherein the threshold score is a score of a next-highest scoring proposed rule.

What is claimed is:
1. A machine-readable medium for searching content items for content corresponding to an event, the machine-readable medium comprising instructions, which when executed by a machine, cause the machine to perform the operations of:
determining a first query rule, the first query rule related to the event;
obtaining from a content repository a first set of one or more content items;

determining a second set of content items comprising content items from the first set that match the first query rule;

determining a proposed second query rule based upon co-occurrences of terms in the second set of content items;

determining a third set of content items comprising content items from the first set that match the proposed second query rule;

scoring the proposed second query rule, the score based upon a tag quality score of tags in the second and third sets of content items;

adding the proposed second query rule to the first query rule based upon determining that the score is over a threshold score; and providing the third set of content items to a requester.

2. The machine-readable medium of claim 1, wherein the first set of one or more content items are microblog messages, and wherein the tags are hashtags.

3. The machine-readable medium of claim 1, wherein the operations of determining the proposed second query rule based upon co-occurrence of terms in the second set of content items comprises the operations of:

extracting a list of keywords that frequently occur from content items in the second set of content items;

sorting the list of keywords based upon total frequency of the keywords in the first set of content items;

bucketizing the sorted list of keywords based upon frequency into a plurality of buckets;

constructing, for each bucket of the plurality of buckets, a co-occurrence graph, the co-occurrence graph based upon co-occurrence of different keywords in same content items; and extracting the proposed second query rule as a clique that is greater than or equal to a predetermined number from the co-occurrence graph of one of the plurality of buckets.

4. The machine-readable medium of claim 1, wherein the operations of scoring the proposed second query rule comprises the operations of:

computing a precision for the first query rule based upon a tag quality of tags from a set of previously determined tags that are present in the second set of content items;

computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

5. The machine-readable medium of claim 4, wherein the operations of scoring the proposed second query rule comprises the operations of:

computing a recall of the first query rule based upon tag quality of the first rule and tag quality of the proposed second query rule;

computing an F1 gain based upon the precision for the first query rule, precision for the proposed second query rule, and the recall of the first query rule;

computing a top-keyword retaining ability score of the proposed second query rule, the top-keyword retaining ability score measuring a similarity between keywords in the second and third sets of content; and calculating the score based upon the F1 gain and the top-keyword retaining ability score.

6. The machine-readable medium of claim 1, wherein the operations are performed in response to an expiry of a predetermined interval.

7. The machine-readable medium of claim 1, wherein the first query rule is received over a computer network, and wherein the operations of obtaining from the content repository the first set of one or more content items comprises sending a message over the computer network to the content repository.

8. The machine-readable medium of claim 1, wherein the first query rule is received over a computer network, and wherein the operations of obtaining from the content repository the first set of one or more content items is performed without traversing an Internet backbone.

9. The machine-readable medium of claim 1, wherein the threshold score is a score of a next-highest scoring proposed rule.

10. A method for searching content items for content corresponding to an event, the method comprising:

using one or more processors to perform the operations of:

determining a first query rule, the first query rule related to the event;

obtaining from a content repository a first set of one or more content items;

determining a second set of content items comprising content items from the first set that match the first query rule;

determining a proposed second query rule based upon co-occurrences of terms in the second set of content items;

determining a third set of content items comprising content items from the first set that match the proposed second query rule;

scoring the proposed second query rule, the score based upon a tag quality score of tags in the second and third sets of content items;

adding the proposed second query rule to the first query rule based upon determining that the score is over a threshold score; and providing the third set of content items to a requester.

11. The method of claim 10, wherein the first set of one or more content items are microblog messages, and wherein the tags are hashtags.

12. The method of claim 10, wherein determining the proposed second query rule based upon co-occurrence of terms in the second set of content items comprises:

extracting a list of keywords that frequently occur from content items in the second set of content items;

sorting the list of keywords based upon total frequency of the keywords in the first set of content items;

bucketizing the sorted list of keywords based upon frequency into a plurality of buckets;

constructing, for each bucket of the plurality of buckets, a co-occurrence graph, the co-occurrence graph based upon co-occurrence of different keywords in same content items; and extracting the proposed second query rule as a clique that is greater than or equal to a predetermined number from the co-occurrence graph of one of the plurality of buckets.

13. The method of claim 10, wherein scoring the proposed second query rule comprises:

computing a precision for the first query rule based upon a tag quality of tags from a set of previously determined tags that are present in the second set of content items;

computing a precision for the proposed second query rule based upon a tag quality of tags from a set of previously determined tags that are present in the third set of content items; and wherein the score for the proposed second query rule is calculated based upon the precision for the first query rule and the precision for the proposed second query rule.

14. The method of claim 13, wherein scoring the proposed second query rule comprises:

computing a recall of the first query rule based upon tag quality of the first rule and tag quality of the proposed second query rule;

computing an F1 gain based upon the precision for the first query rule, precision for the proposed second query rule, and the recall of the first query rule;

computing a top-keyword retaining ability score of the proposed second query rule, the top-keyword retaining ability score measuring a similarity between keywords in the second and third sets of content; and calculating the score based upon the F1 gain and the top-keyword retaining ability score.

15. The method of claim 10, wherein the threshold score is a score of a next-highest scoring proposed rule.

16. A system for searching content items for content corresponding to an event, the system comprising:

one or more processors;

a memory communicatively coupled to the one or more processors and comprising instructions which when executed by the one or more processors, cause the system to perform the operations of:

determining a first query rule, the first query rule related to the event;

obtaining from a content repository a first set of one or more content items;

determining a second set of content items comprising content items from the first set that match the first query rule;

determining a proposed second query rule based upon co-occurrences of terms in the second set of content items;

determining a third set of content items comprising content items from the first set that match the proposed second query rule;

scoring the proposed second query rule, the score based upon a tag quality score of tags in the second and third sets of content items;

adding the proposed second query rule to the first query rule based upon determining that the score is over a threshold score; and providing the third set of content items to a requester.

17. The system of claim 16, wherein the first set of one or more content items are microblog messages, and wherein the tags are hashtags.

18. The system of claim 16, wherein the first query rule is received over a computer network, and wherein the operations of obtaining from the content repository the first set of one or more content items comprises sending a message over the computer network to the content repository.

19. The system of claim 16, wherein the first query rule is received over a computer network, and wherein the operations of obtaining from the content repository the first set of one or more content items is performed without traversing an Internet backbone.

20. The system of claim 16, wherein the threshold score is a score of a next-highest scoring proposed rule.

* * * * *